Oct. 24, 1950   J. F. ANDREWS   2,526,794
SAFETY DEVICE FOR PRESSURE VESSELS
Filed March 23, 1946   2 Sheets-Sheet 1
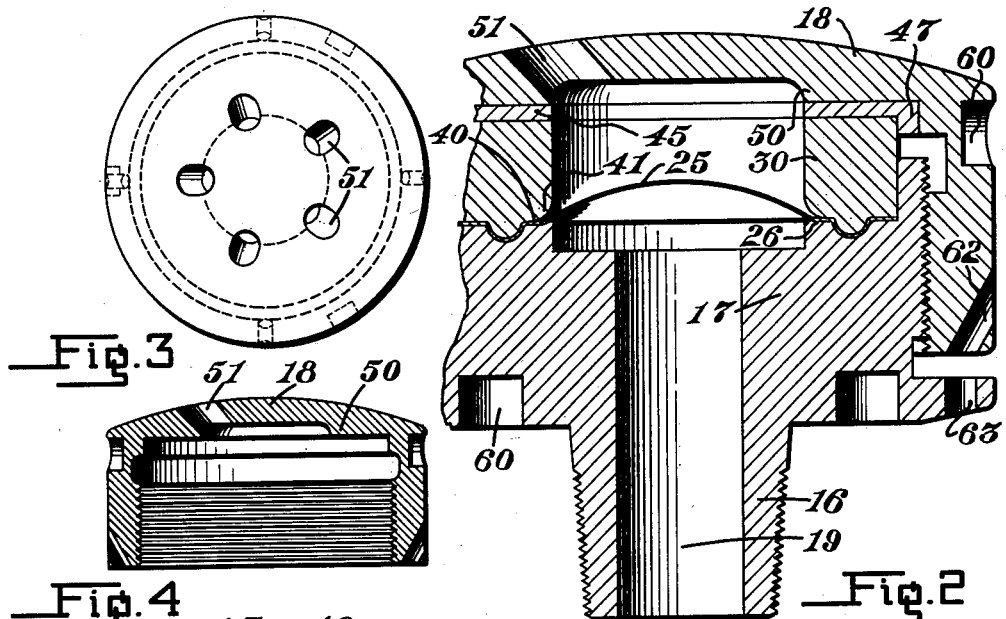
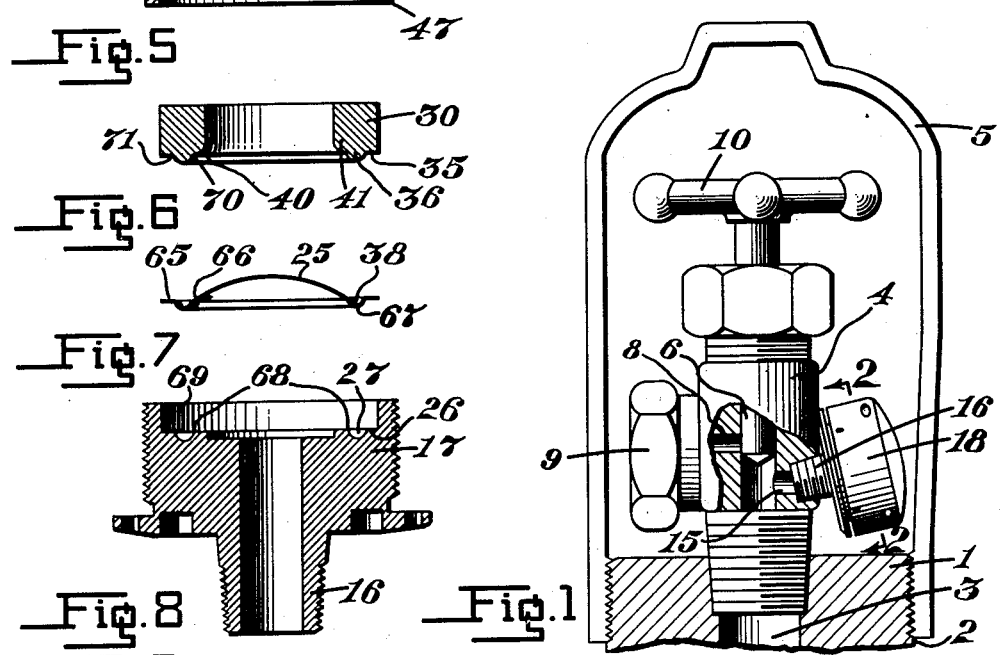
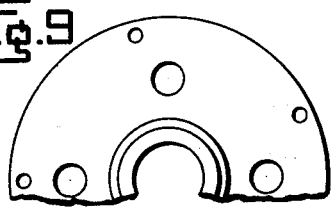
INVENTOR.
JAMES F. ANDREWS
BY Walter C. Wheeler
ATTORNEY Oct. 24, 1950   J. F. ANDREWS   2,526,794
SAFETY DEVICE FOR PRESSURE VESSELS Filed March 23, 1946   2 Sheets-Sheet 2

INVENTOR.
JAMES F. ANDREWS
BY Walter C. Wheeler
ATTORNEY

Patented Oct. 24, 1950

2,526,794

UNITED STATES PATENT OFFICE 2,526,794

SAFETY DEVICE FOR PRESSURE VESSELS

James F. Andrews, Penns Grove, N. J., assignor to E. I. du Pont de Nemours & Company, Wilmington, Del., a corporation of Delaware Application March 23, 1946, Serial No. 656,607

3 Claims. (Cl. 220—89)

This invention relates to safety pressure devices comprising a rupturable or frangible diaphragm for use in connection with systems and containers carrying compressed gas or liquefied gas under pressure. The general purpose of the devices is for releasing gas when the pressure of the confined gas mounts to a predetermined undesired level. The devices of the invention are especially useful in connection with pressure cylinders.

Cylinders for the storage and shipment of compressed gases or liquids are commonly protected against rupture by safety devices of the fusible plug type which open and allow the contents to escape when the temperature reaches that corresponding to the pressure approaching that which would rupture the cylinder. These fusible plug type devices do not afford complete protection, since the pressure may rise dangerously without a corresponding increase in temperature of the fusible plug and therefore without fusion of the plug. Furthermore, the fusible plug devices are entirely unsatisfactory for some kinds of materials which are confined under pressure, such as hydrogen fluoride, which slowly dissolves the fusible metal and impairs the operation of the fusible plug. Devices comprising frangible discs which are directly activated by pressure and free from at least the first of these objections have been used heretofore for autoclaves, pressure lines and the like, but by reason of their construction they are too bulky to be installed on pressure cylinders which are used for transportation purposes and they are not entirely reliable for such uses because of variations in the pressure required for rupturing the discs.

One object of the present invention is therefore to provide more reliable pressure-relief devices which are activated by fluid pressure. Another object of the invention is to provide pressure relief devices which are chemically unaffected by corrosive gases, such as hydrogen fluoride. Another object of the invention is to provide arrangements which can be made sufficiently rugged and compact for installation under the caps with which the valves of shipping cylinders are commonly protected. Still other objects of the invention will be apparent from the following description.

In accomplishing the objects of the invention, I have provided improved structures, a preferred form of which is illustrated in the accompanying drawing, in which Fig. 1 is a side elevational view partially in cross section of the head of a gas cylinder used for shipping gas under pressure, showing the manner of mounting the device thereon;

Fig. 2 is a partial cross sectional view of the frangible disc and the mounting therefor taken along the line 2—2 of Fig. 1.

Fig. 3 is a top plan view of the device;

Figs. 4, 5, 6, 7 and 8 are cross sectional views of the disassembled parts of the device shown in Fig. 2; and Fig. 9 is a bottom plan view of the part shown in Fig. 8.

Figure 11:
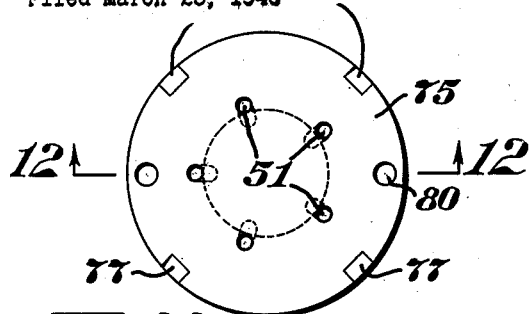
Fig. 11 is a top plan view of a receptacle closure and pressure element for use in the modification shown in Fig. 2.
Figure 12:
Figs. 12, 13, 14 and 15 are cross sectional views of the disassembled parts of the device shown in Fig. 10.
Figure 13:
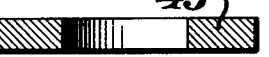
Figure 14:

Referring to Fig. 1, the externally threaded top 1 of the container 2 is provided with a threaded discharge passage 3 in which the valve assembly 4 is mounted and an internally threaded cap 5 is screwed onto the top 1 for protecting the valve assembly from injury during shipment or storage. The valve assembly comprises a valve which is caused to open and close the discharge port 8 leading to the connection 9 by turning the wheel 10 in appropriate direction.

A passage 15 through the wall of the valve mounting between the valve 6 and the container is tapped and the safety device is mounted therein by means of the threaded nipple member 16. The nipple member 16 comprises an enlarged externally threaded head 17 upon which the internally threaded cap 18 is mounted. The upper face of the head 17 is formed into a receptacle communicating with the passage 19 of the nipple. The frangible diaphragm 25 is mounted in the receptacle and is preferably made so that the frangible diaphragm will fit into the receptacle. The bottom of the receptacle is formed with an annular plain ring 26 inside of its upright wall. A rounded groove 27 is cut into the plain face of the annular ring 26 so that outer and inner plain annular surfaces are provided for supporting the frangible disc 25. The disc 25 is preformed with an annular rim pressed to fit on the bottom facing of the receptacle and a pressure washer 30 is formed to fit onto the margin of the preformed disc.

The upper or outer face of the pressure ring 30 is formed to be parallel with the plane of the bottom of the receptacle and the inner face of the ring has an outer annular ring portion 35 parallel with the outer ring portion of the bottom of the receptacle. Inside of the plain portion 35 is a rounded bead or tongue 36 proportioned to bear uniformly upon the disc 25 along the channel portion 38. The disc 25 is provided marginally with an annular rim formed at its outer and inner margins with plain portions for resting uniformly on the plain annular portions of the bottom of the receptacle. A bead 39 is formed in the ring intermediately of the outer and inner plain portions to fit into the circular groove 27 of the receptacle. The annular lower facing of the pressure ring 30 inside of the tongue 36 is formed with a flat annular portion 40 to bear on the disc opposite the inner flat seat 26 of the receptacle and radially inwardly with a rounded portion or fillet 41 which prevents the pressure ring from cutting and rupturing the disc 25 at the margin when the disc is distorted by fluid pressure approaching the intended rupturing pressure.

Bearing on the outer surface of the pressure ring 30 is the equalizing washer 45 which is in the form of a shallow inverted cup having a central opening 46 and an up-standing rim 47 formed to slidably fit over a portion only of the outer cylindrical surface of the pressure ring 30. The ring 30 has a depth which provides sufficient clearance between the rim 47 and receptacle so that the parts can be pressed together and form a gas-tight joint, the margin of the disc 25 acting as a gasket.

The cap 18 is faced interiorly to form a plain annular raised bearing ring 50 to act as a bearing for the outer plain surface of equalizing washer 45, the inner annular wall at the bottom of the cap being formed so as to give a sliding fit to the equalizing washer 45. When the parts are assembled as shown in Fig. 1 and the disc is clamped in place by screwing the interiorly threaded cap 18 onto the exteriorly threaded head 17, an enclosure is formed which is partitioned by the diaphragm 25. The inner chamber of the enclosure is connected with the enclosure of the gas tank through the passages 19, 15 and 3, and the outer chamber connects with the atmosphere through the openings 51 of the cap. The cap 18 serves as the outer clamping or bearing member and as a protector for the diaphragm to prevent accidental breakage thereof by contact with external objects. Upon rupturing of the disc 25, the cap 18 also serves as a means to retain the parts of the fractured disc whilst permitting the gas to escape through the openings 51 and relieve the pressure in the cylinder.

The device can be proportioned so that it can be conveniently mounted on the valve assembly of a pressure cylinder as shown in Fig. 1. The head 17 and cap 18 may conveniently be provided with bores 60 and suitably formed wrenches can be provided for engagement in these openings while mounting the cap. For preventing tampering after assembly, the bores 62 are provided in the cap and 63 in the head so that a lock or seal can be mounted therein for preventing tampering with the safety disc. The venting openings 51 in the cap 13 are preferably directed at an angle to the axis of the fitting for diminishing the liability of accidental rupturing of the disc by objects thrust through the openings 51.

The frangible disc or diaphragm 25 is formed to fit into the receptacle of the head 17. It is provided with a plain outer marginal portion 65 and a plain concentric inner marginal portion 66 which are formed to rest on the plain surface 26 of the bottom of the receptacle. A concentric intermediate bead 67 between the marginal portions is made to conform to the channel 27 in the receptacle and to the tongue 36 of the pressure ring 30 so that when the diaphragm is tightly clamped and seated, there will be no material stressing of the diaphragm-forming portion of the disc. The central portion of the disc 25 inside of the inner ring 66 is a spherical sector, the depth of which may be varied considerably depending on the space available in the rupture disc enclosure and the rupture characteristic required. For use with corrosive gases, the rupture disc may be composed of a material or metal which is not deleteriously affected by the gas to be confined or a plating or coating of metal which is not deleteriously affected by the confined gas may sometimes be provided.

When clamped and in operative position, the disc 25 is formed so that the spherical portion will span the space between the plain inner surfaces 26 of the receptacle and will be spaced from the rounded shoulder 41 of the clamping ring. When gas pressure is applied which is sufficient to rupture the disc 25, the disc will be expanded with this arrangement until it is ruptured at a central point of the disc and it will not be cut, torn or ruptured at the margin. A clearance between the fillet 41 and the spherical portion of the disc is provided so that rupture will occur before contact of the fillet and disc occur. In order to avoid tearing of the disc within the clamping area, the contact edges 68, 69, 70 and 71 in the bottom of the receptacle and in the clamping ring are rounded or filleted and complementary rounded portions are also formed in the disc.

The ring 45 operates to equalize and distribute the pressure over the entire margin of the disc so that with like conditions, like discs will rupture at a constant pressure. The equalizing ring 45 has been found to bring about considerably more uniformity in rupture pressure than when the ring is omitted.

A diaphragm or rupturable disc having constant bursting pressure may be provided by clamping a plain circular disc composed of the desired metal between faces formed like the faces of the receptacle and pressure ring and then impressing fluid pressure on the disc to expand its central area into a spherical segment. In order to obtain discs of constant and reliable bursting pressure, the flat discs are distorted at the edges sufficiently to permanently form flat and channelled rings at the periphery corresponding to the complementary contours of the faces of the receptacle bottom and pressure ring. After having given the edge portions of the discs a permanent set of the desired contour, fluid, such as air approaching the bursting pressure is impressed on the disc until the central area of the disc is bulged and has taken a permanent set. A pressure equal to 85% to 90% of the bursting strength of the disc is desirable. This causes the free central area of the disc to expand into a segment of a sphere.

Instead of regulating the spherical distortion of the disc directly by means of air pressure, I find that discs having a more uniform bursting strength are obtained by impressing the fluid pressure on the disc until a predetermined distortion of the disc is produced which will be effected by the distorting fluid pressure, say of 85% to 90% of the bursting pressure. For example, in making the rupture discs, the distortion from the plane of the face of the receptacle due to 85% to 90% of the bursting pressure of a disc of given composition is empirically determined. Then in a device having clamping faces like those herein described, a gauge is set the determined distance from the plane of the face of the receptacle. After clamping a flat disc in place, a fluid pressure is impressed in excess of the elastic limit of the metal but less than the bursting strength. This force is impressed until the central portion of the metal disc is bulged outwardly the required distance as indicated by the gauge. Discs of uniform thickness and kind which are formed in this manner are found to have more uniform bursting characteristics than those which are formed by stamping methods. The bursting strength of discs thus formed will be very close to the intended bursting pressure of the discs and their variation from each other is less than among similar discs formed by turning or stamping.

Pure metals, such as copper, platinum or silver, usually give the most uniform bursting pressures and such metals are preferred for manufacturing discs, but alloys having uniform physical characteristics can be successfully used. Where chemically active gases are confined, a metal is chosen which is non-reactive to the confined gas. The rupture discs are given a thickness depending upon the strength of the metal and the pressure to be confined. Then with a given contour in the receptacle, the pressure ring is formed so that after the metal of the disc is grooved into the channel of the receptacle the face of the pressure ring will be the complement of the contacting face of the disc.

Figure 10:
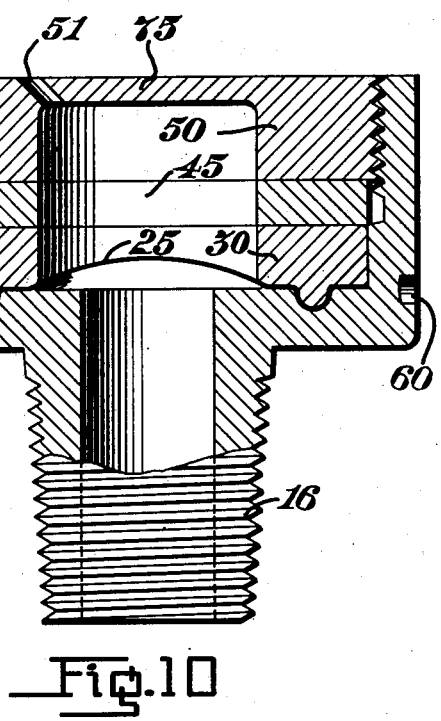
Fig. 10 is a partial cross sectional view of a modification of the device shown in Fig. 2.
Figure 15:
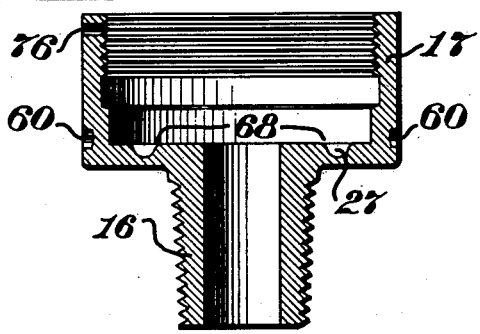

In the modification shown in Fig. 10, the head 17 is threaded internally and its threaded side walls from a receptacle sufficiently deep to enclose the pressure ring 30 and equalizing ring 45, and to accommodate the clamping means and enclosure member, such as nut 75. The equalizing ring 45 is modified so that it will easily fit inside of the threaded receptacle and be provided with sufficient outer peripheral diameter and interfacial areas to communicate a uniform pressure when the threaded enclosure member 75 is advanced down into the receptacle. The member 75 is provided with openings 51 which serve as venting passages to the atmosphere when the diaphragm 25 is ruptured and the gas from the cylinder flows into the enclosure formed by the central openings of the pressure and equalizing rings 30 and 45. A part of this enclosure may be formed by the raised annular bearing ring 50 of the nut 75.

Figure 16:
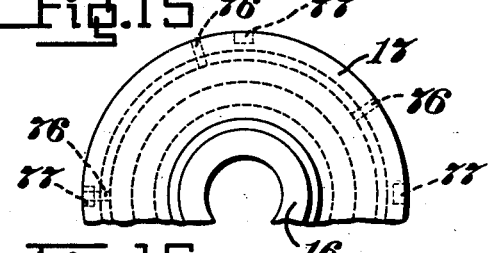
Fig. 16 is a bottom plan view of the device shown in Fig. 10.

In this modification the means for retaining the bearing ring or nut member 75 in clamping position comprises the openings or small bores 76 through the wall of the receptacle 17 near its rim and the marginal slots 77 in the nut 75. The centers of the bores 76 are in a plane spaced from the plane of the rim of the receptacle a distance such that one of them will be barely opened at the inside end into the opening 77 of the nut when the nut 75 is screwed down to clamp a diaphragm of given thickness into working position. The openings 77 at the margin of the nut 75 are each of equal depth. Preferably a number of such openings, say four, preferably equally spaced, are made in the outer periphery of the nut, and a different number of bores 76, say 5 or 6, preferably equally spaced, are made through the wall of the receptacle in a plane such that some one of the slots 77 will register with one of the bores 76 and leave it fully open when the nut is screwed down to full clamping position as indicated by the coincidence of bore 76 and slot 77 in Fig. 16. As a safety measure, preventing or indicating tampering with the mounted diaphragm, a wire may be passed through the unobstructed bore 76 and the ends of the wire locked or sealed. Any displacement of the nut 75, sufficient to affect the set of the diaphragm 25, would shear the wire. Countersunk bores 80 are provided in the outer surface of the nut 75 to accommodate an appropriate spanner for manipulating the nut. The vents 51 in the nut 75 are directed diagonally toward the axis of the receptacle to afford protection from slender objects which might pierce the diaphragm if the vents 51 were parallel to the axis. The openings 51 may be of any convenient size provided they afford satisfactory venting in case of rupture of the diaphragm. It is evident that diagonally disposed openings of smaller diameter afford the maximum protection from such damage to the diaphragm, preferably a diameter and declination of bore 51 in a nut 75 of given thickness such that only a tortuous passage is presented to a slender object which is advanced parallel to the axis of the receptacle.

This is a continuation-in-part of my copending application Serial No. 586,255, filed April 2, 1945, now abandoned.

It is evident that various embodiments of the invention may be made without departing therefrom, and it is to be understood that I do not limit myself to the specific embodiments thereof which are hereinbefore described except in so far as they are specifically defined in the annexed claims.

I claim:

1. In a device of the kind described, a diaphragm having a dome-shaped central portion and a peripheral marginal portion consisting of an outer and inner plain ring and a rounded channeled portion formed intermediately of the plain rings; a tubular receptacle having a threaded cylindrical wall and an internal circular seat formed to fit the contour of the lower surface of the peripheral portion of the diaphragm, said seat extending inwardly toward the central tubular opening and forming a plain shoulder wider than said inner plain ring of the diaphragm, a cylindrical pressure ring having a diaphragm contact face formed to fit the contour of the upper surface of the outer ring and channeled portion of the diaphragm; said pressure ring having a filleted inner shoulder providing an expansion space between the ring and the bulging portion of the diaphragm, and an outer plane clamping face on said pressure ring normal to the inner cylindrical wall of the receptacle, an equalizing ring bearing on the pressure ring; and a threaded pressure member engaging a threaded wall of said receptacle and bearing on the equalizing ring for clamping the marginal portions of the diaphragm between the pressure ring and said seat of the receptacle.

2. A device in accordance with claim 1 in which the clamping means comprises a cap having an upper inner recessed portion within the cap forming a seat and receptacle for the equalizing ring, the threaded cylindrical portion being between said receptacle and the margin of the cap; and a threaded outer portion of the receptacle threaded for engaging the threaded portion of the cap.

3. A device in accordance with claim 1 in which both the pressure ring and the equalizer ring are mounted within the receptacle, the cylindrical wall of the receptacle is internally threaded and the clamping means is a nut having venting openings therethrough, said nut being threaded for mounting in said receptacle.

JAMES F. ANDREWS.

REFERENCES CITED

The following references are of record in the file of this patent:

UNITED STATES PATENTS

| Number | Name | Date |
|---|---|---|
| 138,171 | Matthews | Apr. 22, 1873 |
| 328,008 | Conner et al. | Oct. 13, 1885 |
| 443,873 | Snow | Dec. 30, 1890 |
| 1,549,665 | Hill et al. | Aug. 11, 1925 |
| 1,962,281 | Myhrum | June 12, 1934 |
| 2,123,662 | Raymond | July 12, 1938 |
| 2,194,159 | Bonyun et al. | Mar. 19, 1940 |
| 2,242,547 | Raymond | May 20, 1941 |
| 2,263,840 | Franck | Nov. 25, 1941 |
| 2,284,773 | Sivian et al. | June 2, 1942 |
| 2,309,856 | Mason | Feb. 2, 1943 |